United States Patent [19]

Pelletier

[11] 4,159,007

[45] Jun. 26, 1979

[54] TRAVELLER DEVICE, PARTICULARLY A SHEET RAIL TRAVELLER

[75] Inventor: Jean Pelletier, Le Pradet, France

[73] Assignee: Coast Catamaran France S.A., Hyeres, France

[21] Appl. No.: 855,741

[22] Filed: Nov. 29, 1977

[30] Foreign Application Priority Data

Dec. 10, 1976 [FR] France ............... 76 37306

[51] Int. Cl.² .............................................. B63H 9/08
[52] U.S. Cl. ................................... 114/204; 114/112
[58] Field of Search .............. 114/204, 102, 108, 109, 114/111, 112, 223, 218; 105/475, 481, 482

[56] References Cited

U.S. PATENT DOCUMENTS

| 3,875,889 | 4/1975 | Robbins | 114/204 |
| 3,978,809 | 9/1976 | Snyder, Jr. | 114/204 |
| 4,013,031 | 3/1977 | Viviano | 114/39 X |

Primary Examiner—Trygve M. Blix
Assistant Examiner—Sherman D. Basinger
Attorney, Agent, or Firm—Marvin Feldman; Stephen E. Feldman

[57] ABSTRACT

A device comprising, on the one hand, a slide closed at its ends and, on the other hand, a traveller able to slide in the slide, this traveller not being able to be pulled out of the slide in a direction perpendicular to the sliding direction. The traveller comprises at least two separate elements 12a, 12b meant to be placed back to back and able to slide in relation to each other; removable lockings V are provided for maintaining the two elements 12a, 12b in position; when the two elements are assembled, it is not possible to disengage the traveller in a direction perpendicular to the sliding direction. Application is to sheet rail travellers for controlling a sail of a sailing boat.

10 Claims, 2 Drawing Figures

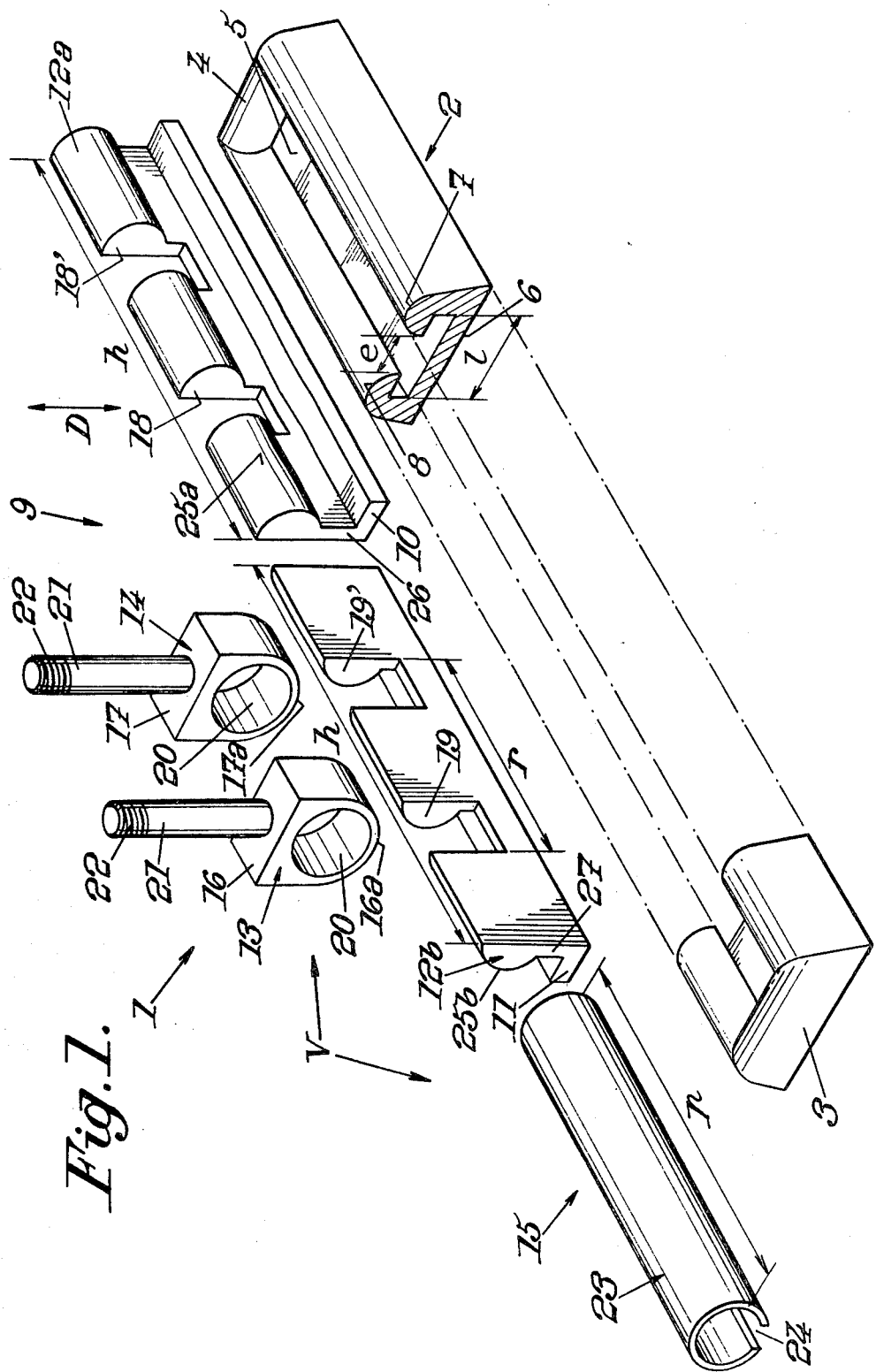

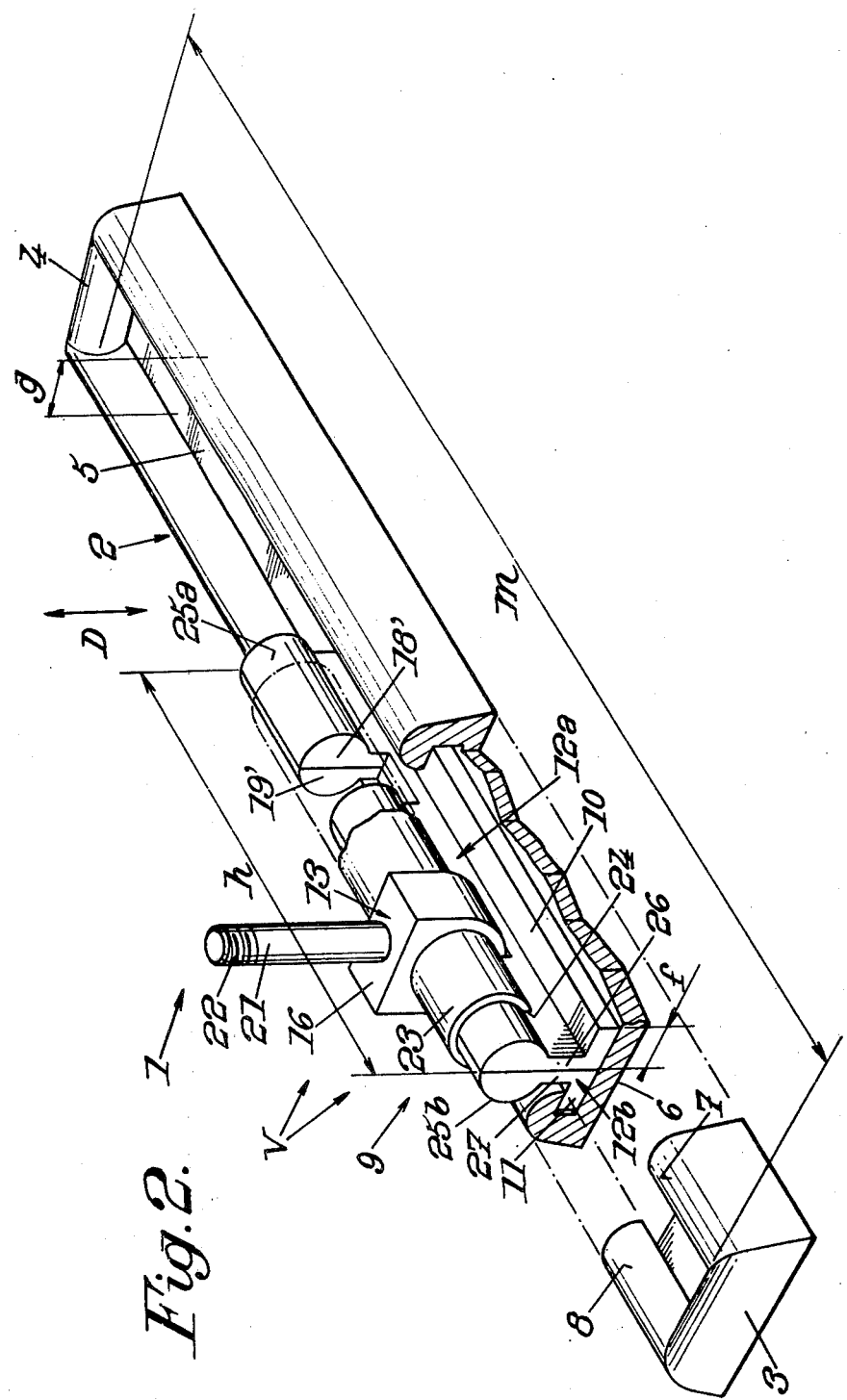

TRAVELLER DEVICE, PARTICULARLY A SHEET RAIL TRAVELLER

The invention relates to traveller devices, of the kind comprising:

on the one hand, a slide closed at its ends and having in its upper part, a longitudinal slot limited by two flanges,
and on the other hand, a traveller, able to slide longitudinally in the slide and comprising two side wings engaged under said flanges so that the traveller cannot be pulled out in a direction perpendicular to the sliding direction.

The invention concerns more particularly, because it is in this case that its application seems to present the most interest, but not exclusively, sheet rail traveller devices for controlling a sail on a sailing boat.

The invention has as its objective, especially, to make these devices so that they answer better than heretofore the different demands of practice and particularly such that the disassembling of the traveller and its removal from the slide are improved.

According to the invention, a traveller device of the kind previously defined, is characterised by the fact that the traveller comprises, on the one hand, two separate elements, intended to be placed back to back, to form the assembly of said traveller, these elements being able to slide in relation to each other in the slide and having a length less than half the distance between the ends of the slide, so that each element may be completely separated from the other, in the longitudinal direction and be disengaged from the slide and, on the other hand, removable locking means provided for maintaining the two elements assembled back to back, the whole being such that when these two elements are assembled it is not possible to disengage the traveller from the slide in a direction perpendicular to that of sliding.

Advantageously, each element of the traveller comprises a lower part with L-shaped cross section, intended to be introduced into the slide so that the lower leg of the L is engaged under a flange.

The maximum width of the lower part of each element introduced into the slide is less than the width of the slot.

The two elements of the traveller are, preferably, symmetrical to each other in relation to a longitudinal intermediate plane of the traveller, the cross-section of each element being equal to half the total cross-section of the traveller.

The locking means for the elements of the traveller comprise at least a member for locking, in the longitudinal direction, one element of the traveller with respect to the other, when the elements are placed back to back, and a member for clamping the locking member in relation to the elements of the traveller.

The or each locking member is advantageously formed by a key able to cooperate with a notch provided in each element, when these notches are placed one opposite the other, the elements being disposed back to back.

Each key comprises an opening, intended to be turned with its axis parallel to the longitudinal direction of the slide when this key is engaged in said notches, and the clamping member is formed by a shaft slidable, parallel to the longitudinal direction of the slot, in this opening, when the key has been positioned, this shaft cooperating with thrust surfaces on the upper parts of the elements of the traveller situated outside the slide.

The clamping shaft is advantageously formed by a tubular element, with circular cross-section, comprising a longitudinal slot, whereas the thrust surfaces provided on each element of the traveller are formed by zones with semi-circular cross-section or semi-cylindrical parts, the openings provided in the keys being circular, the whole being such that said tubular shaft may be engaged around the semi-cylindrical parts of the elements of the traveller and introduced into the circular openings of the keys, so that these latter are clamped in relation to the traveller, while retaining a possibility of rotating about said shaft.

Each key is fitted with a shank, threaded at its end, projecting from the side opposite the slide to allow the fixing of accessories intended to be mounted on the traveller.

The invention consists, apart from the arrangements outlined above, of certain other arrangements which will be more explicitly discussed hereafter in connection with a particular embodiment described with reference to the accompanying drawings, but which is in no wise limiting.

FIG. 1 of these drawings is a perspective view, with parts cut away, showing in exploded form, a traveller device conforming to the invention, before assembly;

FIG. 2 finally shows also in perspective, with parts cut away, the assembled device.

Referring to the drawings, there can be seen therein a sheet rail traveller device 1 for controlling a sail on a sailing boat, particularly a sailing boat of the catamaran type.

The device comprises a slide 2 which is fixed towards the rear of the boat, and extends athwartships of the boat.

This slide 2 is formed from a metal section, particularly made from aluminium or a light alloy, with a C-shaped cross-section, as can be seen in the drawings. This slide is closed at its longitudinal ends 3 and 4 and presents, in its upper part, a longitudinal slot 5 corresponding to the opening of C. The back 6 of the C-shaped cross-section is turned downwards. The closure of ends 3 and 4 is achieved by any appropriate means, particularly by means for fixing the slide 2 on the boat. Slot 5 is limited by two flanges 7, 8 of the slide, so that distance e between the inner edges of the flanges 7 and 8 is less than distance l (FIG. 1) between the inner faces of the walls of slide 2.

Device 1 also comprises a traveller 9 (FIG. 2) able to slide longitudinally in slide 2; this traveller supports in a conventional way reversing and jamming means (not shown) for a sheet connected to the end of the boom of the sail. Reference may be made, to any complementary explanation, to the prior art, e.g. the published French Pat. No. 2,267,238 (national registration No. 75 11 439) corresponding to U.S. Pat. No. 3,875,889.

Traveller 9 comprises two side wings 10,11 engaged in the inner space of the slide under flanges 7,8 (see FIG. 2), so that the traveller may be removed from slide 2 in a direction D, shown by a double arrow, perpendicular to the direction of sliding of the traveller and perpendicular to the plane of the lower face 6 of slide 2.

Traveller 9 comprises two separate elements 12a, 12b, meant to be placed back to back, as shown in FIG. 2 so as to form the traveller assembly.

These elements can slide in relation to each other in slide 2. Each element has a length h less than half distance m between the closed ends 3 and 4 of the slide so that each element 12a, 12b may be completely separated from the other in the longitudinal direction, as shown in FIG. 1, and be disengaged from the slide.

The two elements 12a, 12b are advantageously symmetrical to each other in relation to the longitudinal intermediate plane of traveller 9 when this latter is assembled, as can be seen in FIG. 2. Elements 12a, 12b are then placed back to back with their flat faces, located in the intermediate plane, in contact.

Each element 12a, 12b comprises a lower part with an L-shaped cross-section, as can be seen in the drawings; the lower leg of the L of element 12a forms the wing 10, whereas wing 11 is formed by the lower leg of element 12b.

The maximum width of the lower part of each element 12a, 12b, i.e. width f of wings 10,11 is less than the width g of the slot, so that, when elements 12a, 12b are separated from one another, in the longitudinal direction, it is possible to disengage the lower wing 10 or 11 from the corresponding flange by a transverse movement and to remove, from the slide, elements 12a, 12b by a movement in direction D.

The traveller device 1 comprises also removable locking means V, provided to maintain the two elements 12a, 12b assembled back to back, as shown in FIG. 2; when these two elements as assembled together, the removal or the disengagement of traveller 9 in direction D is not possible, for the lower wings 10,11 of elements 12a, 12b are stopped by flanges 7 and 8 of slide 2.

These locking means comprise, on the one hand, two locking members 13,14 for locking, in the longitudinal direction, elements 12a, 12b, in relation to each other in their back to back position and, on the other hand, a clamping member 15, for clamping the locking members 13,14 in relation to the elements of the traveller.

The two locking members 13,14, much like fiddle screws, each comprise a key 16 or 17 able to cooperate with a notch 18 or 18', provided in element 12a, and with a notch 19 or 19' provided in element 12b, when these elements are placed back to back and when the notches are disposed opposite each other.

As can be seen in the drawings, each key 16, 17 has a lower part 16a, 17a semi-cylindrical in shape and an upper part in the shape of a right-angled parallelepiped. Notches 18, 18', 19,19', rectangular in shape, as can be seen in FIG. 1, allow the associated key 16, 17 to enter with a small clearance. The generatrices of the semi-cylindrical part of the key 16, 17 are directed parallel to the longitudinal direction of each element 12a, 12b, when the traveller is assembled (FIG. 2).

Keys 16, 17 comprise a central through opening 20, with circular section, and whose axis merges with that of lower semi-cylindrical part 16a, 17a.

A shank 21, threaded at its end 22, is integral with each key and projects from the upper face of this key. This shank 21 is meant for mounting any conventional accessory on the traveller device.

Clamping member 15 is formed by a tubular element 23, forming a shaft, comprising a longitudinal slot 24. The axial length p of this clamping member is greater than distance r separating the most distant outer edges of the two end notches provided in each element 12a, 12b.

The clamping member or shaft 23 is able to cooperate with thrust surfaces 25a, 25b provided on each element of traveller 12a, 12b. These thrust surfaces 25a, 25b are formed by semi-cylindrical zones having a semi-cylindrical cross-section corresponding to half the inner section of clamping shaft 23. These thrust surfaces 25a, 25b extend the end of the vertical wing 26, 27 of each element 12a, 12b. This vertical wing passes through slot 5 of the slide.

When elements 12a, 12b are positioned in slide 2, the semi-cylindrical thrust surfaces 25a, 25b are entirely located outside slide 2, above this slide.

The width of the longitudinal slot 24 is at least equal to the sum of the widths of wings 26 and 27 so that these wings, disposed back to back, may be engaged in slot 24.

Elements 12a, 12b of the traveller can be formed from any appropriate material, particularly from self-lubricating plastic material.

Clamping shaft 23 is advantageously made from a stainless steel tube.

The mounting of the traveller device of the invention follows directly from the preceding explanations.

The two elements 12a, 12b, separated from each other in the longitudinal direction, are introduced into slide 2 through slot 5, so that the lower wings 10 and 11 are engaged under flanges 7 and 8.

These elements 12a, 12b are then slid into the slide so as to place them back to back, the corresponding notches 18, 19, 18', 19' being placed face to face.

Keys 16, 17 are then introduced into the notches and placed so that the axis of openings 20 coincides with the common longitudinal axis of the semi-cylindrical thrust surfaces 25a, 25b. Clamping shaft 23 is then fitted over the thrust surfaces 25a, 25b, slot 24 receiving the vertical wings 26,27.

This clamping shaft 23 maintains pressed close together elements 12a, 12b and passes through openings 20 of keys 16, 17. The clamping of these keys 16,17 in relation to the traveller 12a, 12b is then achieved. The keys 16, 17 retain however the possibility of rotating around tubular element 23.

The traveller thus mounted forms an assembly, as shown schematically in FIG. 2. In this FIG. 2 the second key has not been shown, for a better understanding of the drawing. It is then possible to mount conventional accessories on the threaded shanks 21 of keys 16, 17.

Dismantling is achieved just as readily by carrying out the operations in the reverse order.

The device of the invention provides rapid assembly and disassembly of the traveller and particularly of elements 12a, 12b, advantageously formed from a moulded self-lubricating plastic material, which wear due to the friction engendered during their movements.

It is thus possible to replace very easily these elements, without a tool kit, and without having to take down the slide 2.

This possibility of replacement of elements 12a, 12b, without special tools and without having to disassemble slide 2 is an important advantage.

With the devices of the prior art where the traveller is in a single piece, because the slide 2 is closed at both its ends, changing the traveller requires disassembly of the slide. Since the slide is generally riveted to its support, its disassembly and its re-assembly can only be carried out in the factory with appropriate tooling.

I claim:

1. A traveller device, particularly a sheet rail traveller for controlling a sail on a sailing boat, comprising, on the one hand, a slide closed at its ends and having, at its upper part, a longitudinal slot defined by two flanges and, on the other hand, a traveller longitudinally slidable in the slide and comprising two side wings engaged under said flanges so that the traveller cannot be pulled out from the slide in a direction perpendicular to the sliding direction, characterised by the fact that the traveller comprises, on the one hand, at least two separate elements, meant to be placed back to back, for forming said traveller assembly, these elements being slidable in relation to each other in the slide, and having a length less than half the distance between the ends of the slide, so that each element maybe completely separated from the other, in the longitudinal direction, and be disengaged from the slide and, on the other hand, removable locking means provided to maintain the two elements assembled back to back, the whole being such that when these two elements are assembled it is not possible to disengage the traveller from the slide in a direction perpendicular to that of sliding.

2. A device according to claim 1, characterised by the fact that each element of the traveller comprises a lower part having an L-shaped cross-section meant to be introduced into the slide so that the lower leg of the L is engaged under a flange, the maximum width of the lower part of each element introduced into the slide being less than the width of the slot.

3. A device according to claim 1, characterised by the fact that the two elements of the traveller are symmetrical to each other in relation to a longitudinal intermediate plane of the traveller, the cross-section of each element being equal to half the total cross-section of the traveller.

4. A device according to claim 1, characterised by the fact that the elements of the traveller comprise at least a locking member for locking, in the longitudinal direction, one element of the traveller in relation to the other when the elements are placed back to back, and a clamping member for clamping the locking member in relation to the elements of the traveller.

5. A device according to claim 4, characterised by the fact that each locking member is formed by a key able to cooperate with a notch provided in each element when these notches are placed facing each other, the elements being disposed back to back.

6. A device according to claim 5, characterised by the fact that each key comprises an opening, meant to be directed with its axis parallel to the longitudinal direction of the slide when this key is engaged in said notches, and the clamping member is formed by a shaft able to be slid, parallel to the longitudinal direction of the slot, into this opening, when the key has been positioned, this shaft cooperating with thrust surfaces provided on the upper parts of the elements of the traveller, situated outside the slide.

7. A device according to claim 6, characterised by the fact that the clamping shaft is formed by a tubular element with circular cross-section, comprising a longitudinal slot, whereas the thrust surfaces provided on each element of the traveller are formed by semi-cylindrical zones with semi-circular cross-section, the openings provided in the keys being circular, the whole being such that said tubular shaft may be engaged about the semi-cylindrical zones of the elements of the traveller and introduced into the circular openings of the keys, so that these latter are clamped in relation to the traveller, while retaining the possibility of rotating about said shaft.

8. A device according to claim 7, characterised by the fact that the clamping shaft is formed by a stainless steel tube.

9. A device according to claim 5, characterised by the fact that each key is provided with a shank threaded at its end, projecting from the side opposite the slide, to allow the fixing of accessories intended for mounting on the traveller.

10. A device according to claim 1, characterised by the fact that the elements of the traveller are formed from a self-lubricating plastic material, particularly moulded.

* * * * *